(12) United States Patent
Suggi Liverani et al.

(10) Patent No.: US 9,474,405 B2
(45) Date of Patent: Oct. 25, 2016

(54) CARTRIDGE WITH CREMA GENERATING SEPTUM AND METHOD USING SAME

(75) Inventors: Furio Suggi Liverani, Trieste (IT); Luca Mastropasqua, Trieste (IT); Frans Van Eeden, Milan (IT); Bruno Dellapietra, Aurisina (IT)

(73) Assignee: ILLYCAFFE' S.P.A., Trieste (IT)

( * ) Notice: Subject to any disclaimer, the term of this patent is extended or adjusted under 35 U.S.C. 154(b) by 1269 days.

(21) Appl. No.: 11/746,771

(22) Filed: May 10, 2007

(65) Prior Publication Data
US 2007/0261564 A1    Nov. 15, 2007

(30) Foreign Application Priority Data

May 12, 2006    (IT) .............................. MI2006A0945

(51) Int. Cl.
| | |
|---|---|
| A47J 31/24 | (2006.01) |
| A47J 31/34 | (2006.01) |
| A47J 31/40 | (2006.01) |
| A47J 31/44 | (2006.01) |
| A47J 31/46 | (2006.01) |
| A47J 31/36 | (2006.01) |
| A47J 31/00 | (2006.01) |

(52) U.S. Cl.
CPC ............. *A47J 31/369* (2013.01); *A47J 31/002* (2013.01); *A47J 31/4496* (2013.01)

(58) Field of Classification Search
CPC .. A47J 31/46; A47J 31/4403; A47J 31/3633; A47J 31/36; A47J 31/3609; A47J 31/3614; A47J 31/3623; A47J 31/3666; A47J 31/368; A47J 31/3685; A47J 31/44; A47J 31/369; A47J 31/002; A47J 31/4496; A47J 31/34; A47J 31/465
USPC .......... 99/295, 323, 279, 280, 289 R, 302 R; 426/77, 112, 115, 433, 78, 79
See application file for complete search history.

(56) References Cited

U.S. PATENT DOCUMENTS

| | | | |
|---|---|---|---|
| 4,077,551 A * | 3/1978 | Manaresi | 222/494 |
| 4,829,889 A * | 5/1989 | Takeuchi et al. | 99/289 P |
| 5,083,504 A * | 1/1992 | Koga et al. | 99/302 R |
| 5,598,764 A * | 2/1997 | Bambi | 99/295 |
| 5,896,806 A * | 4/1999 | Dal Tio | 99/289 T |

(Continued)

FOREIGN PATENT DOCUMENTS

| | | | |
|---|---|---|---|
| EP | 0 726 053 | 8/1996 | |
| EP | 726053 A1 * | 8/1996 | ............. A47J 31/40 |
| WO | 2005/092160 | 10/2005 | |

OTHER PUBLICATIONS

International Search Report; PCT/EP2007/001046; Apr. 19, 2007.

*Primary Examiner* — Eric Stapleton
(74) *Attorney, Agent, or Firm* — Cantor Colburn LLP (57) ABSTRACT

A method for extracting an espresso coffee beverage by an espresso coffee machine is provided. The method includes providing an extraction chamber and a normally-closed septum arranged downstream of a coffee dose and made of elastic material and provided directly with a small orifice in the septum, injecting a preset dose of hot water into the chamber at a pressure ranging from 2 to 4 bars and for a first preset time interval keeping the septum closed, interrupting the injection of hot water for a second preset time interval, injecting hot water into the chamber after the interrupting with outward dispensing of the beverage being prevented through the septum and extraction.

8 Claims, 8 Drawing Sheets

(56) References Cited

U.S. PATENT DOCUMENTS

| | | | |
|---|---|---|---|
| 6,792,980 B1* | 9/2004 | Cortese | 141/1 |
| 6,904,840 B1* | 6/2005 | Pfeifer et al. | 99/295 |
| 7,281,467 B2* | 10/2007 | Cai | 99/293 |
| 7,604,826 B2* | 10/2009 | Denisart et al. | 426/77 |
| 7,694,624 B2* | 4/2010 | Chen et al. | 99/302 R |
| 2002/0078831 A1* | 6/2002 | Cai | 99/295 |
| 2004/0173102 A1* | 9/2004 | Halliday et al. | 99/295 |
| 2005/0160918 A1* | 7/2005 | Winstanley et al. | 99/279 |
| 2005/0166765 A1* | 8/2005 | Lyall | 99/280 |
| 2005/0279215 A1* | 12/2005 | Cai | 99/279 |
| 2006/0037481 A1* | 2/2006 | Bicht | 99/279 |
| 2006/0107841 A1* | 5/2006 | Schifferle | 99/279 |

* cited by examiner

CARTRIDGE WITH CREMA GENERATING SEPTUM AND METHOD USING SAME

The present invention relates to a method for extracting espresso coffee particularly from a cartridge with a crema generating septum and to the beverage obtainable from the method.

BACKGROUND OF THE INVENTION

It is known that machines for preparing espresso coffee typically used in bars and restaurants require a dose of roasted and ground coffee to be placed in a filtering vessel which is installed in the machine. This vessel is part of the so-called filter basket holder, which is filled manually with the dose of ground coffee (7±1 g for each cup to be dispensed) and then mounted on the machine in order to proceed with the extraction of the beverage.

Espresso coffee preparing machines are provided internally with a boiler for heating the water taken from a reservoir or other source and with a pump for sending hot water at a selected pressure to the output duct.

The traditional method for extracting the beverage by means of known machines typically consists of a first preinfusion step, in which the flow-rate of water entering at 90±2° C. is reduced for a certain time interval; a second imbibition step; and a third extraction step, in which the pod of coffee is crossed by a flow of hot water at 90±2° C. at a constant pressure of 9 bars when it enters the powdered coffee pod.

The beverage obtained from traditional espresso coffee machines is usually clearly distinguishable from the beverage that can be obtained at the household level with coffee pots or infusion devices, not only because the flavor, aroma and body properties are different, but also because the beverage obtained from traditional espresso coffee machines is characterized by a surface layer of foam, also known as crema. Crema is an attribute of the coffee beverage which is particularly appreciated by the consumer and is also an indicator of the correct preparation of the beverage. The factors that influence the result of crema in the cup are mainly the degree of grinding, the degree of roasting, the carbon dioxide content in the coffee, the temperature and characteristics of the water, the pressure of the water, the temperature of the assembly, the temperature of the cup, the time elapsed between preparation and consumption, the method for conveying the beverage from the extraction chamber to the cup, the level of cleanliness and the efficiency of the extraction assembly.

As stated in international applications WO 2005/092160 and WO 2005/092162, as well as in European patent application 05020525.1, the Applicant of the present patent application has designed a particular cartridge which contains roasted and ground coffee and is provided with an elastic septum; by means of said cartridge it is possible to extract a beverage with improved physical and organoleptic characteristics with respect to espresso coffee obtained with traditional machines.

The beverage obtained with the cartridges described in the applications cited above can be obtained without having to reprogram particularly traditional espresso coffee machines but by using simply a particular extraction assembly which can be fixed at the hot water outlet.

For different reasons, a consumer is usually unable to drink an espresso coffee directly after its extraction by means of the traditional machine. This occurs often in restaurants, in which espresso coffee is brought to the table of the consumer a long time after its extraction, since typically many espressos are prepared at the same time and the waiter waits to be loaded with multiple cups before going to distribute them among the tables. Another reason why espresso coffee might not be drunk immediately after extraction is its high temperature.

Since the crema obtained in espresso coffee obtained with the traditional method has a relative short persistence, the time that separates the end of extraction from the moment when the espresso coffee is drunk can be so long that the espresso coffee loses part of the crema obtained with extraction, thus reducing the quality of the beverage at the time of consumption.

Moreover, again for different reasons, a consumer does not warm the cups before use, scarcely takes care to clean the machine, keeps the coffee exposed to the air for prolonged periods, uses the coffee assembly even when it is not properly heated, thus compromising the expected crema result.

SUMMARY OF THE INVENTION

The aim of the present invention is to obviate the drawbacks cited above by providing a method for preparing espresso coffee which allows to obtain a crema whose physical and organoleptic characteristics are independent of the conditions in which preparation occurs.

Within this aim, an object of the invention is to provide an espresso coffee provided with a crema whose persistence over time is extended.

Another object is to obtain an espresso coffee whose crema is independent of the temperature of the cup.

Another object is to obtain an espresso coffee whose crema is independent of the degree of efficiency of the assembly.

Moreover, an object of the present invention is to obtain an espresso coffee whose crema is independent of the time that elapses between when it is prepared and when it is drunk.

Another object of the invention is to obtain an espresso coffee whose crema is independent of the content of carbon dioxide and of the characteristics of the coffee used for preparation.

Another object is to obtain an espresso coffee whose crema is independent of the system for conveying the beverage from the extraction assembly to the cup.

Still another object of the invention is to provide a method which is highly reliable and relatively easy to apply to traditional espresso coffee machines.

This aim and these and other objects, which will become better apparent hereinafter, are achieved by a method for extracting an espresso coffee beverage by means of an espresso coffee machine, which comprises: a) a step for providing an extraction chamber, which comprises a dose of roasted and ground espresso coffee and a normally-closed septum which is arranged downstream of said coffee dose; b) a step of injecting hot water into the chamber, outward dispensing of the beverage being prevented through the normally-closed septum; c) an extraction step in which, when the water pressure reaches a preset value, the septum is opened in order to force the beverage to pass through a small orifice before it is dispensed into the cup, the size of the orifice being such as to keep the dose of coffee contained in the extraction chamber at a substantially uniform pressure along the direction of the flow of hot water, so that the espresso coffee beverage extracted through the orifice comprises crema.

The aim and objects of the invention are also achieved by an espresso coffee beverage which can be obtained from the method described above, characterized in that it comprises crema which has a distribution of bubble diameters which is substantially uniform in the 20-150 micron range.

Moreover, the aim and objects of the invention are also achieved by an espresso coffee machine, which comprises an extraction assembly which contains a cartridge and a normally-closed septum provided with an openable through orifice, a boiler which has a fluid connection to the extraction assembly, and a pump for injecting into the cartridge hot water originating from the boiler, the cartridge containing a dose of roasted and ground coffee, characterized in that it comprises control means which store instructions for:
  injecting hot water at such a pressure as to prevent dispensing of beverage toward the outside of the extraction assembly through the septum;
  increasing the pressure of the hot water up to a preset value, so as to open the orifice in order to force the beverage to pass through the orifice before it is dispensed into a cup, the size of the orifice being such as to keep the dose of coffee at a substantially uniform pressure along the direction of the flow of hot water, so that the espresso coffee beverage extracted through the orifice comprises crema.

BRIEF DESCRIPTION OF THE DRAWINGS

Further characteristics and advantages of the invention will become better apparent from the description of a preferred but not exclusive embodiment of the method according to the invention, illustrated by way of non-limiting example in the accompanying drawings, wherein.

DESCRIPTION OF THE PREFERRED EMBODIMENTS

Figure 1:
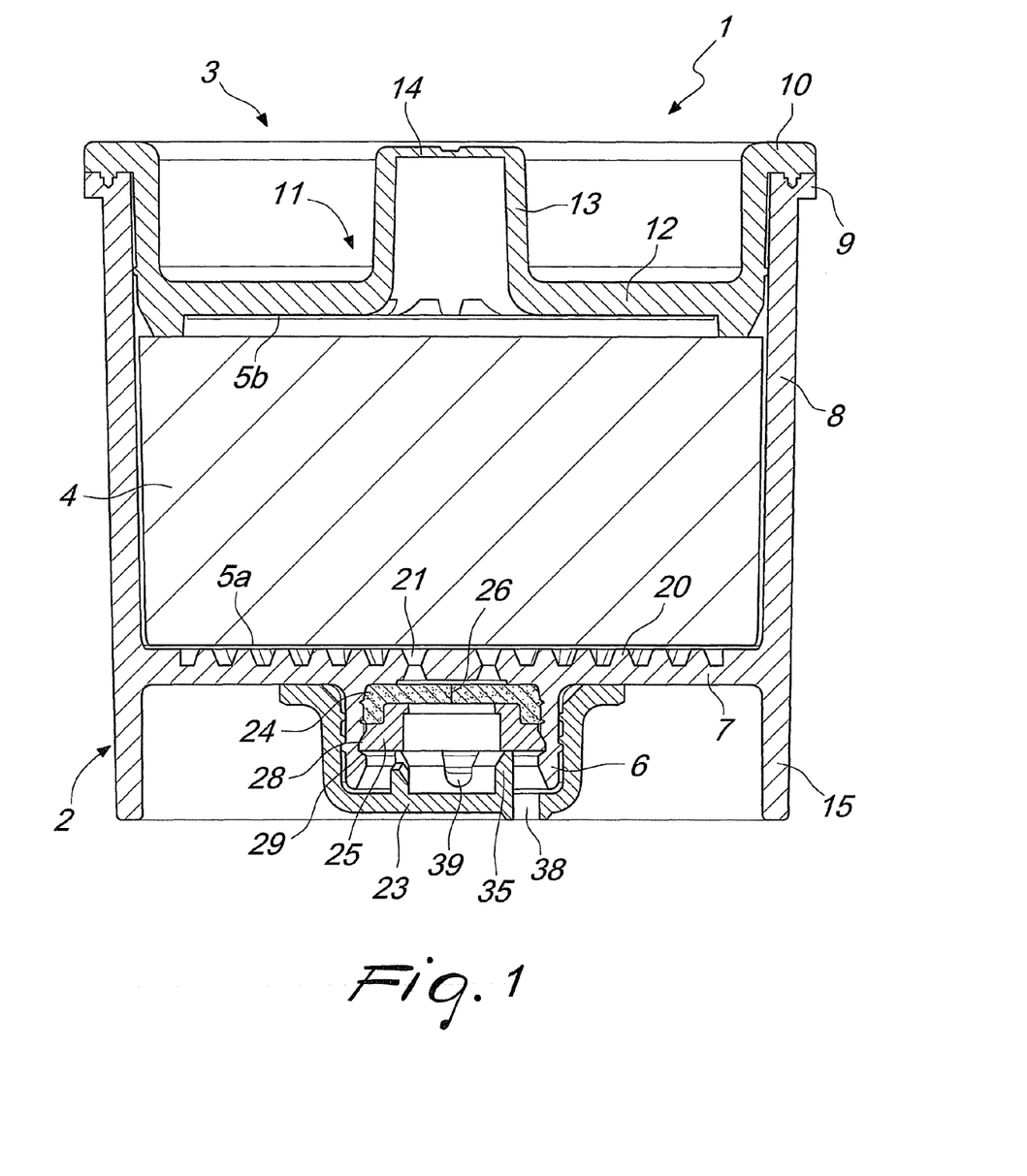
FIG. 1 is an axial sectional view of a cartridge used in a preferred embodiment of the method according to the invention.

In greater detail, FIG. 1 is an axial sectional view of the cartridge described in European patent application no. 05020525.1 by the same Applicant. The cartridge, generally designated by the reference numeral 1, is substantially cylindrical and comprises a cup portion 2 and a lid portion 3 which is fixed to the cup portion so as to form an internal volume of the cartridge 1. The internal volume of the cartridge 1 accommodates a dose or pod 4 of roasted and ground coffee, which is placed between two flexible filters 5a and 5b which are made of paper or fabric or similar material.

The cup portion 2 comprises a base 7, a side wall 8 which protrudes from the base and a rim 9 which is arranged on the opposite side with respect to the base and forms an open end of the cup on which a corresponding rim 10 of the lid portion 3 is heat-sealed or otherwise fixed.

A plurality of ribs 20 are provided on the surface of the base 7 that is directed toward the internal volume of the cartridge 1 and are adapted to form a fine canalization between the lower filter 5a and an opening 21 formed in the center of the base. At this opening, which forms the outflow point of the beverage, the base 7 has an outlet port 6, which protrudes from the base toward the outside of the cartridge.

The lid 3 is provided with a base 12 and with a beverage inlet port 13, which protrudes toward the outside of the cartridge, the top of which is generally closed and can be opened by piercing.

A cartridge which is substantially identical to the one described up to now is also taught by international applications WO 2005/092160 and WO 2005/092162, the contents of which are considered here as an integral part of the present patent application. These prior applications also disclose the use of an elastic septum which is arranged at the outlet port 6 and which, by having a through slit or otherwise an orifice which is very narrow, is capable of keeping closed in an airtight manner the internal volume of the cartridge until the pressure inside the cartridge reaches a certain threshold value, beyond which the septum undergoes deformation and consequently opens the slit or orifice, allowing the passage of the beverage through said widened orifice or slit.

European patent application 05020525.1, the contents of which also are included herein by reference, describes such a septum 24 made of elastomeric or rubber-like material, which is provided with a corresponding through slit 26 and is fixed to the internal surface of the outlet port 6 by means of a rigid supporting ring 25. The supporting ring 25, on which the elastic septum 24 is fixed, is provided with a peripheral protrusion 28, which engages a corresponding recess 29 formed on the internal surface of the outlet port 6.

In order to ensure more effectively the fixing of the ring 25, the cartridge 1 also comprises an optional septum cover 23, which can be locked by snap action on the outer surface of the outlet port 6 and has an internal cylindrical wall 36 which is provided with openings 39 in order to provide additional support for the rigid ring 25 and allow the outflow of the beverage through an opening 38 which is spaced from the axis of symmetry of the cartridge 1.

Figure 2:
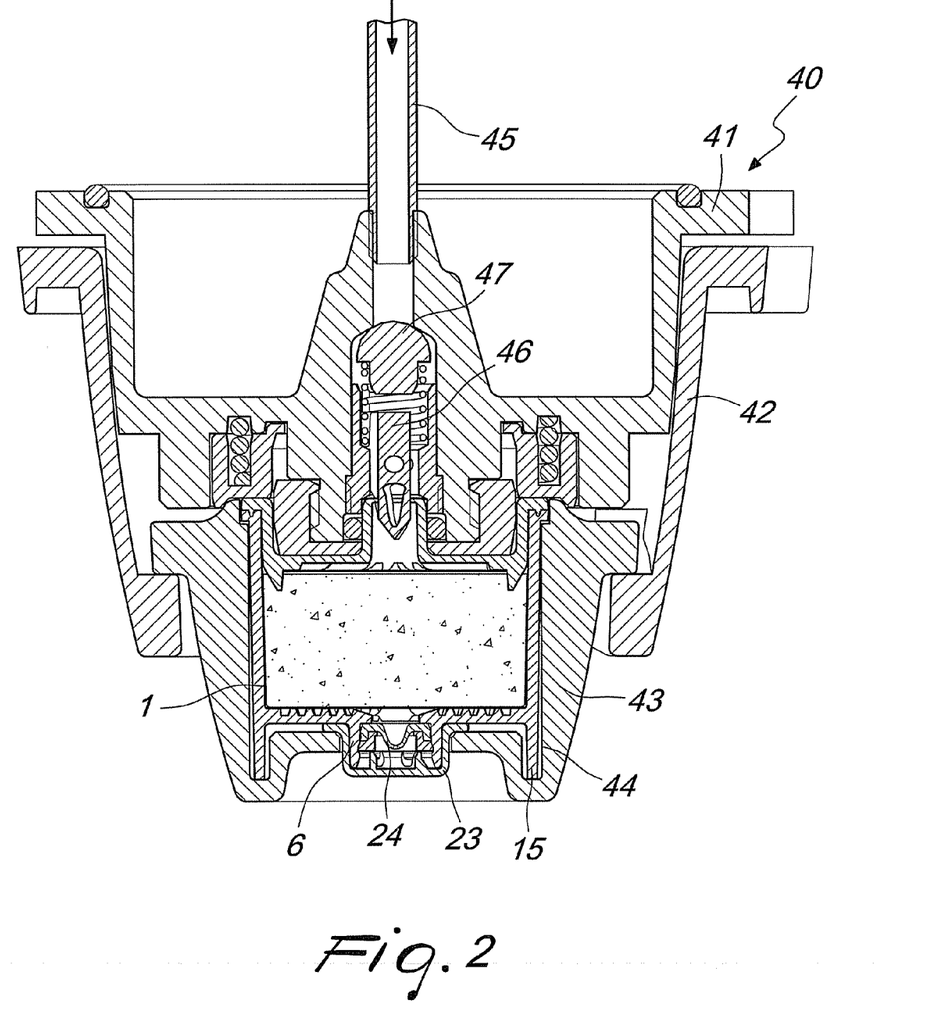
FIG. 2 is an axial sectional view of an extraction assembly used in the preferred embodiment of the method according to the invention.

The cartridge 1 can be installed in a machine for preparing espresso coffee by means of an extraction assembly, preferably of the type shown in FIG. 2 and in European patent application no. 05020525.1.

The extraction assembly, generally designated by the reference numeral 40, is preferably composed of a support 41, which can be coupled to a pressurized hot water duct 45 which belongs to the machine, a bell-shaped element 42 which is fixed to the support, and a filter basket holder 43 which can be fastened to the bell-shaped element 42 by means of a bayonet coupling.

The support 41 preferably consists of the lower part of a boiler.

The filter basket holder 43, provided with a handle which is not shown in the figure, is provided internally with a cylindrical shape, which substantially matches the shape of the lateral surface of the cartridge, and preferably has an annular groove 44 which is adapted to receive the flange 15 which protrudes from the peripheral region of the base of the cartridge 1.

The support 41 of the extraction assembly, which can be fixed to the espresso coffee extraction machine, is provided with an injection needle 46 and with a mushroom valve 47 in order to adjust the flow of hot water that arrives from the duct 45 toward the inside of the cartridge 1.

Other extraction assemblies can be used as an alternative to the one described, for example the assemblies known from international applications WO 2005/092160 and WO 2005/092162.

Another extraction assembly which can be used comprises a filter basket holder provided with a septum or valve which are normally closed and arranged at the outflow point of the extracted beverage and are capable of opening, under pressure or on command, a very narrow passage (on the order of tenths of a mm) for the extracted beverage.

Figure 3:
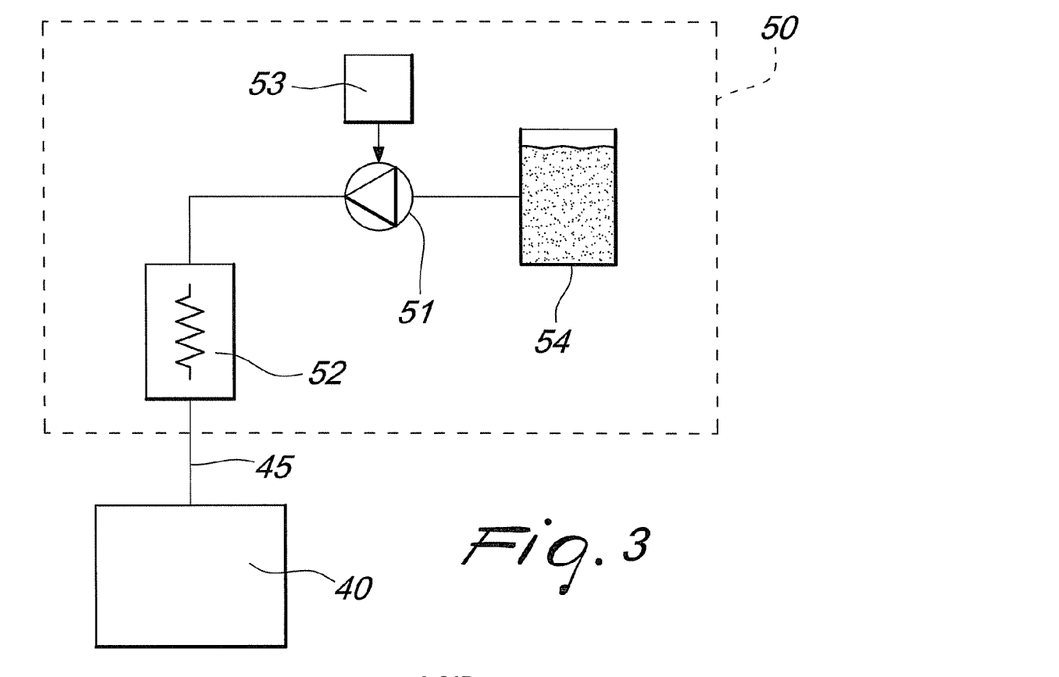
FIG. 3 is a schematic view of a machine for preparing espresso coffee which can be used to carry out the invention.

Using the reference numeral 40 to generally designate an extraction assembly which comprises such a septum or valve, provided either in the cartridge as shown in FIG. 1 or externally thereto (for example in the filter basket holder), a machine 50 suitable to perform the method according to the invention comprises a pump 51 interposed between a boiler 52 and a water reserve 54, the latter being optionally replaceable with a direct connection to the water distribution mains. The machine is completed by a control means 53, which is capable of controlling components of the machine and stores the instructions for performing the method according to the invention.

Preferably, the boiler 52 is substantially cylindrical and is arranged adjacent and coaxially to the extraction chamber which accommodates the cartridge 1. An opening for the inflow of cold pressurized water is present on the lateral surface of the boiler. The chamber inside the boiler 52 comprises the duct 45 of FIG. 2, which is arranged along the axis of the boiler, and a heating coil, which is wound around the axial duct 45. Finally, on the upper part of the boiler there is an electric valve, which can be actuated on command by the controller 53 and is adapted to allow the flow of the water from the inside of the boiler to the inside of the axial duct 45 and the discharge of the water from the duct 45 at the end of the extraction.

Figure 4:
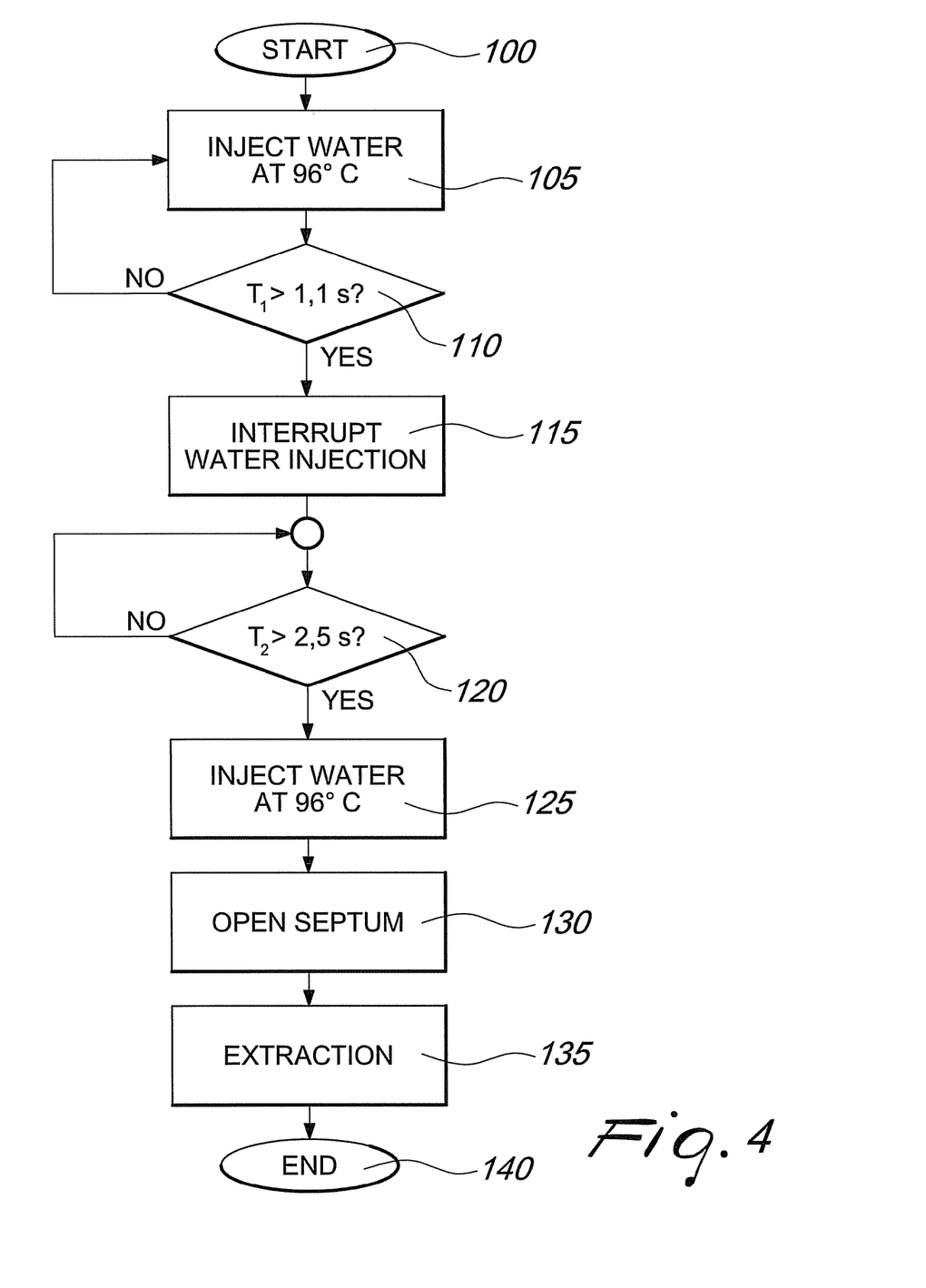
FIG. 4 is a flowchart of an embodiment of the method according to the invention.
Figure 5:
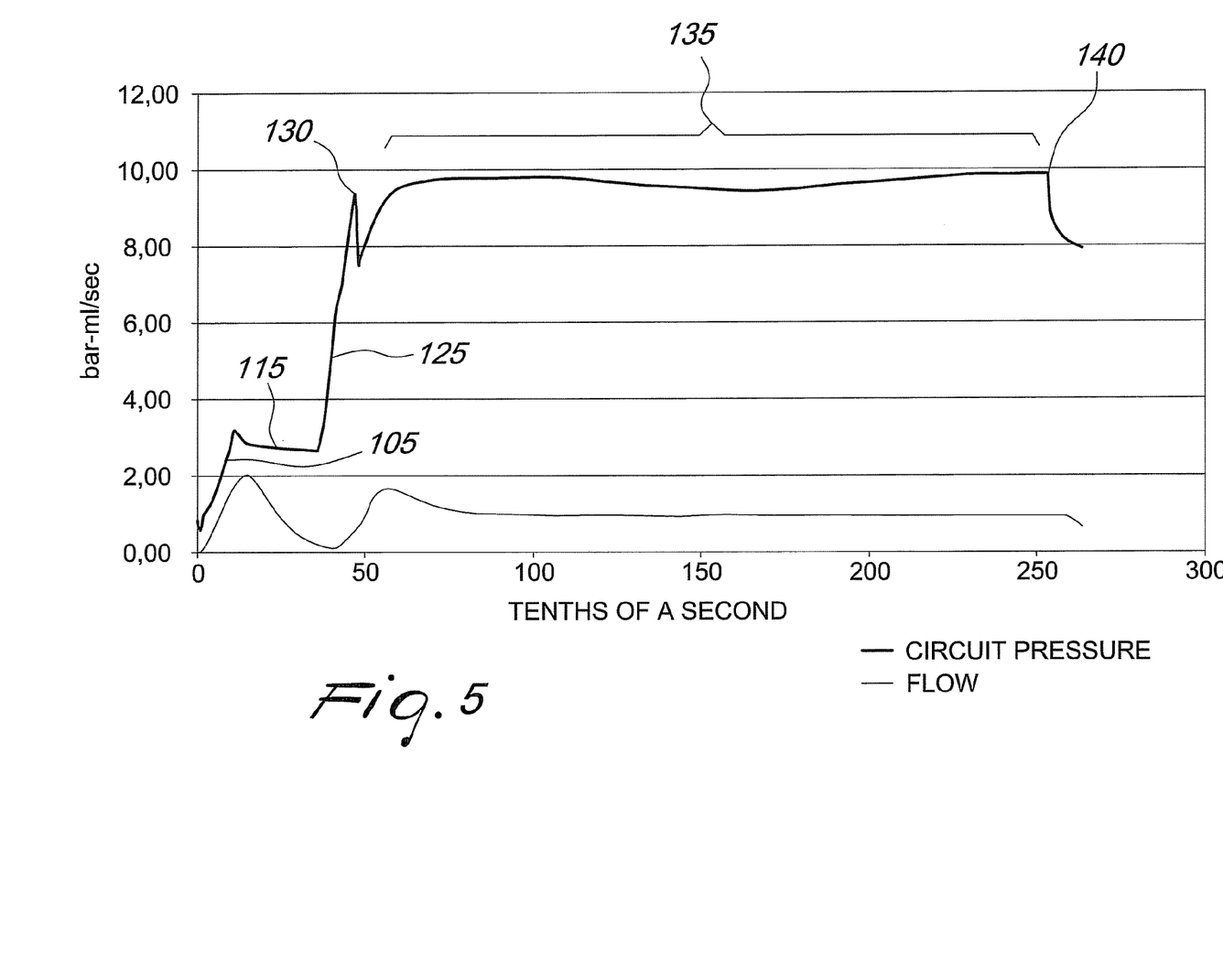
FIG. 5 plots the flow and pressure measured upstream of the boiler as a function of time in a method according to the invention.

With reference to FIGS. 4 and 5, the method according to a preferred embodiment of the invention comprises a first step 100 for opening the electric valve and switching on the pump 51.

This step can be preceded by a step for mechanical piercing of the cartridge arranged in the filter basket holder, depending on the type of cartridge used. The embodiment described here can be applied to the extraction of espresso coffee from a dose of ground coffee powder weighing approximately 6-7 g.

A preinfusion step 105 then follows, during which hot water at a temperature from 90 to 99° C., more particularly at 96° C., is injected from the duct 45. The hot water is injected at a reduced flow-rate for a preset time interval (for example approximately 1.1 seconds). In this step, the pressure of the water is such that the septum 24, or more generally the septum arranged in the extraction assembly at the exit point of the beverage, remains closed. In particular, in the preinfusion step 105 the pressure of the water injected into the coffee pod 4 is much lower than the steady-state pressure and is substantially on the order of 2 bars, preferably less than 4 bars.

Once the preinfusion time has elapsed (step 110), the injection of water is interrupted (step 115) in order to allow the imbibition or homogenization of the coffee pod arranged in the extraction assembly 40 with the water injected in the preceding step.

After a second preset time interval has elapsed, for example 2.5 seconds (step 120), hot water at 90-99° C., more particularly at 96° C., is injected again into the cartridge according to a pressure ramp which depends on the hydraulic resistance of the machine-cartridge system and on the flow-rate of the pump 51 (step 125).

When a high pressure value, preferably higher than 6 bars or even more preferably ranging from approximately 6 to 9 bars, is reached, the elastic septum 24, or more generally the septum arranged in the extraction assembly at the exit point of the beverage, opens (step 130), so as to allow the beverage to pass through an orifice which measures a few tenths of a mm or is in any case very small.

The partition opens autonomously thanks to its elasticity. However, in other embodiments of the invention the partition can be replaced by any valve means, even an actuated one, so long as it is adapted to force the flow of espresso coffee through a very narrow passage before it exits from the extraction assembly.

It has been found that by using a cartridge with an elastic septum 24 which is pre-perforated in a central point 26, such as the ones described in patent applications PCT WO 2005/092160 and WO 2005/092162 and in European patent application no. 05020525.1, the pressure drop at the septum when it is in the open state ranges from approximately 5 to 7 bars.

An extraction step 135 then begins during which the coffee pod 4 is crossed by a flow of pressurized hot water and the espresso coffee exits from the septum. During this step, the pressure at the cartridge inlet ranges preferably from 9 to 12 bars and the average flow-rate ranges from 0.7 to 1.3 grams per second, for an espresso coffee preparation program, and 2-3 grams per second for a weak coffee preparation program.

The crema exits from the very first moments of extraction.

Finally, after approximately twenty seconds, the pump is stopped and the electric valve is closed. Extraction thus ends (step 140).

As a whole, the coffee pod 4 is percolated with a volume of water which, depending on the preparation, can vary from 20 to 50 ml.

By using a cartridge provided with a septum, such as the cartridge of FIG. 1 or the cartridges described in international patent applications WO 2005/092160 and WO 2005/092162, or more generally by arranging an elastic septum or similar valve means at the outflow point of the beverage in the extraction assembly, it can be seen that the coffee pod 4 is subjected to a pressure which on average is higher, and in any case more uniform, than in known machines.

In traditional machines, the pressure drop between the upper layer of the coffee tablet and the lower layer in fact goes from 10 bars to approximately 0 bars (atmospheric pressure), whereas in the method according to the invention the pressure drop goes from approximately 10 bars of the upper layer to approximately 6 bars of the lower layer.

Moreover, in the traditional method there is substantially no pressure drop at the filter on which the coffee pod rests, since the beverage passes through a surface which is provided with a large number of holes and does not cause significant resistance to the passage of the beverage. In the method according to the invention, instead, the extracted coffee is forced to pass under pressure through a very narrow passage, i.e., with high resistance, provided in an elastic septum. Accordingly, in a very short time interval the beverage is forced to pass from a high-pressure region arranged upstream of the septum (6-7 bars) to a region at atmospheric pressure downstream of the septum.

It has been found that by using the method according to the invention not only is it possible to obtain a creamy espresso coffee, but the resulting crema has a considerable persistence over time, even 120 minutes, without the liquid fraction of the beverage being visible on the surface.

Moreover, in the effervescence step that occurs after percolation, the separation between the liquid phase and the crema is slower than in traditional processes. By way of example, FIGS. 10 and 11 illustrate two test tubes which contain 20 g of espresso coffee which has been percolated respectively with the method according to the invention and with the traditional method, both imaged 10 seconds after the end of percolation.

Each of the test tubes consists of a glass cylinder with standardized dimensions (outside diameter 27.5 mm, inside diameter 23.5 mm, height 72.5 mm).

Figure 10:
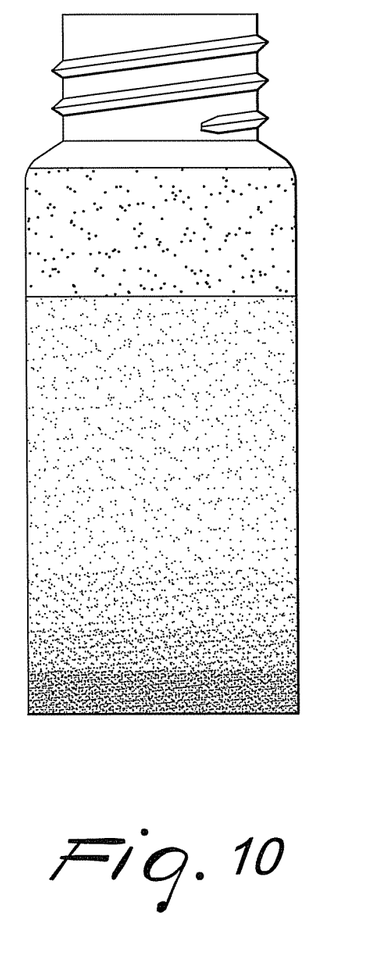
FIGS. 10 and 11 are schematic views of the containers used for the backscattering measurements of FIGS. 8 and 9, respectively.

FIG. 10 already allows to see that in the sample of espresso coffee according to the invention the liquid phase, illustrated by thicker shading, is considerably reduced with respect to the creamy phase.

Figure 11:
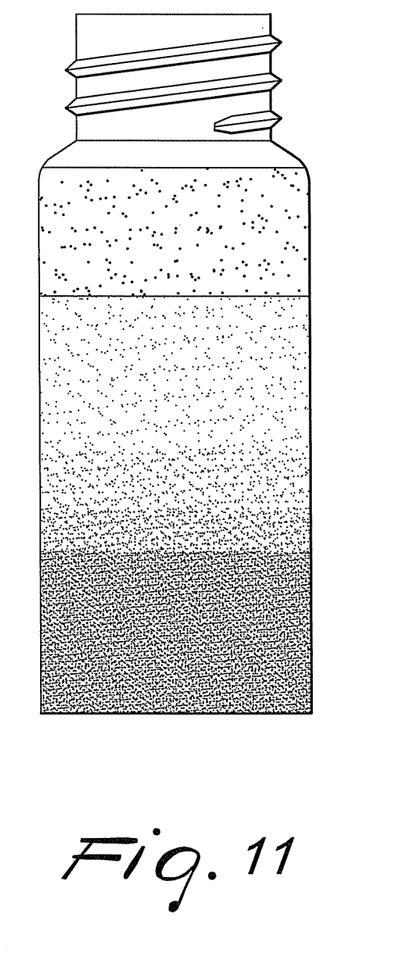

It is possible to obtain a verification of this property by analyzing the backscattering properties of the sample contained in the containers of FIGS. 10 and 11.

Figure 8:
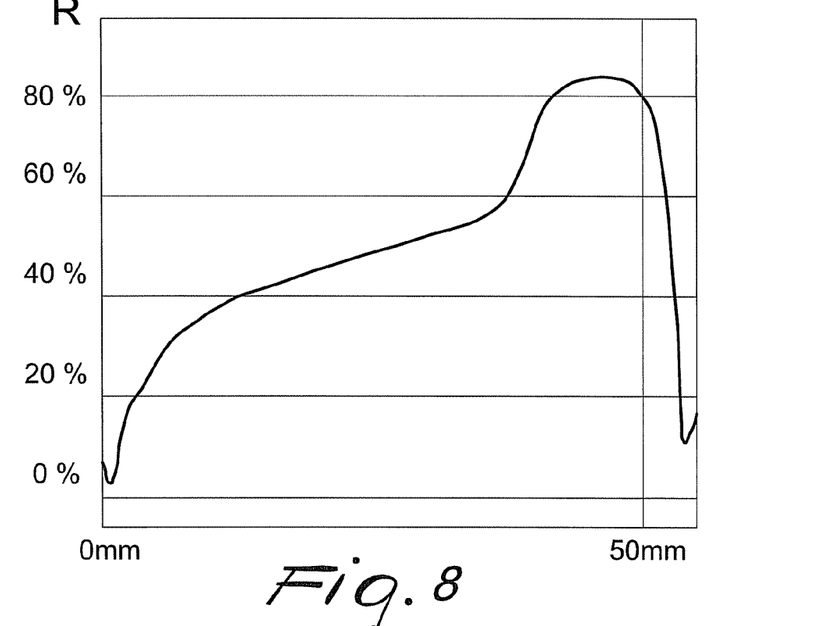
FIG. 8 plots backscattering as a function of the distance from the bottom of a container of espresso coffee obtained with the method according to the invention.
Figure 9:
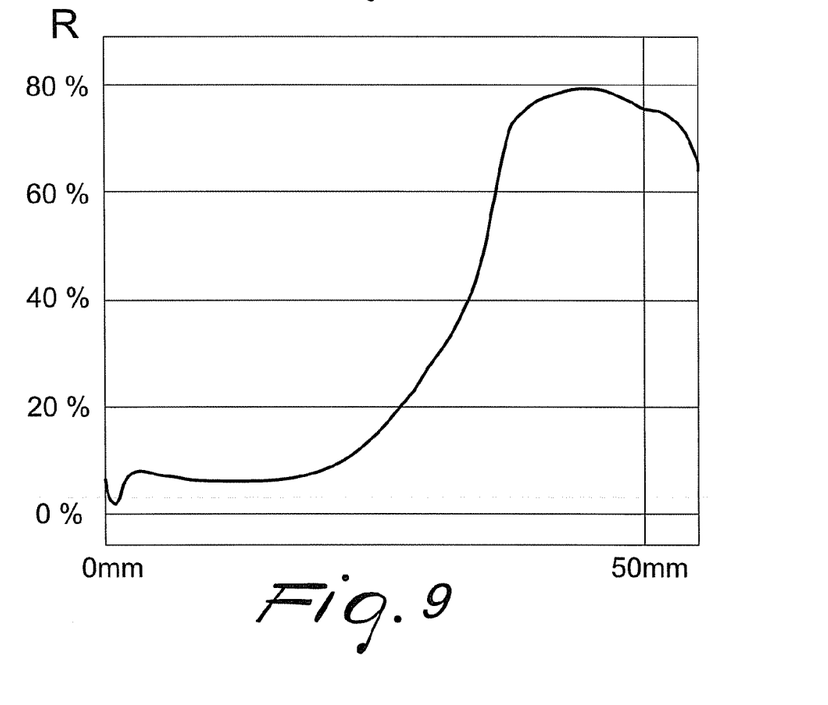
FIG. 9 plots backscattering as a function of the distance from the bottom of a container of espresso coffee obtained with the traditional method.

The results are shown in FIGS. 8 and 9, which plot the backscattering profiles related to the effervescence step for two samples obtained by means of the process according to the invention and the traditional process, respectively as a function of the distance from the bottom of the container, 10 seconds after the end of percolation.

In the instrument used for the measurement, the light source has a wavelength of 880 nm (near infrared). An optical sensor arranged at 45° with respect to the incident beam receives the backscattering light that arrives from the sample. The sample in the cell is kept at 30° C. by means of a thermostat, and scans are performed on each sample, starting 10 seconds after percolation, for a total of five minutes and 10 seconds of analysis.

The figure shows immediately that the two fronts have a different imprint, and in particular the espresso coffee according to the invention has a backscattering value which is much higher than zero along the entire height of the sample analysis cell. This points out that the separation between the liquid phase and the foam is delayed in the beverage according to the invention with respect to traditional espresso, which instead has a region of separation between the liquid phase and the foam phase already after the 10 seconds that elapse between the end of percolation and the first scan.

With the same instrument it is also possible to highlight a percentage drop of the crema at a fixed time (for example 2 minutes) which is greater for the traditional espresso preparation.

The following table lists the average backscattering values for the two types of beverage, measured on seven different samples by type.

| traditional espresso | invention |
|---|---|
| average backscattering | |
| 35.1 | 51.1 |
| 39.6 | 44.0 |
| 30.3 | 52.6 |
| 39.1 | 52.3 |
| 38.1 | 53.5 |
| 37.7 | 53.7 |
| 35.3 | 50.5 |
| average | |
| 36.5 | 51.1 |

Figure 6:
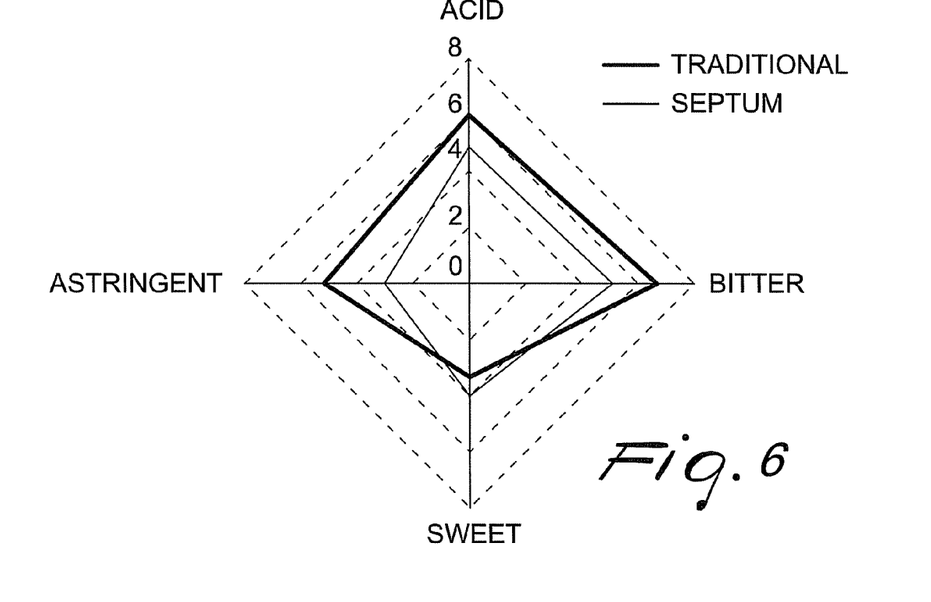
FIG. 6 plots the values of the organoleptic characteristics, measured by using a panel of judges, of the froth of an espresso coffee obtained with the traditional method and with the method according to the invention.

Organoleptic tests have shown that the crema is also less bitter and astringent than the crema obtained with traditional espresso coffee machines used at the professional level, whereas acidity and sweetness remain substantially unchanged (FIG. 6). The different taste characteristics with respect to the crema of the traditional beverage make the crema according to the invention more appreciable.

Despite this, the distinctive characteristic of the beverage obtained with the method according to the invention is the persistence of the crema. In particular, it has been found surprisingly that the crema of the espresso coffee that is obtained is characterized in that the distribution of the diameters of the bubbles is substantially uniform in a diameter interval ranging from approximately 20 to 150 microns.

Figure 7:
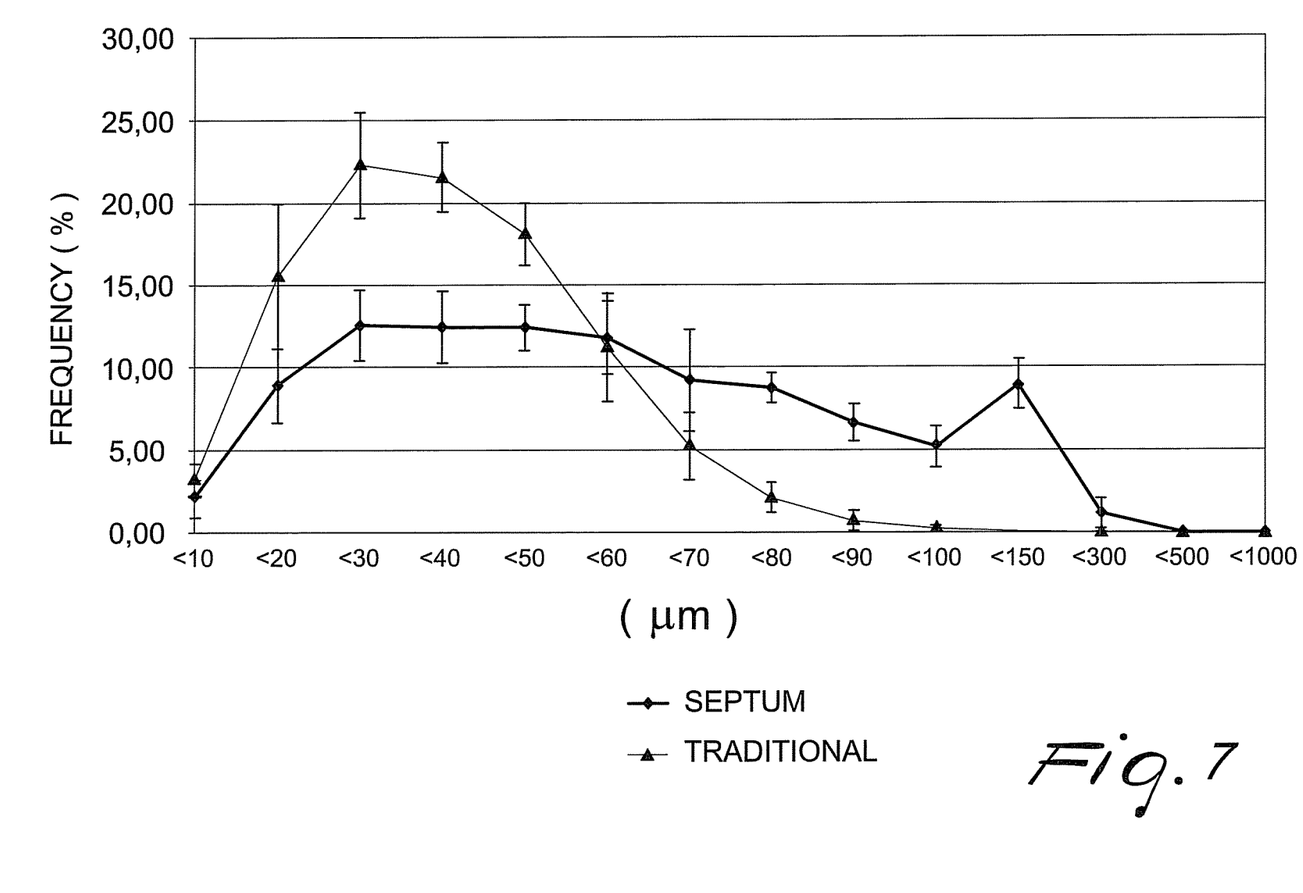
FIG. 7 plots the distribution of the diameters of the bubbles of an espresso coffee obtained with the traditional method and with the method according to the invention.

In greater detail, with reference to FIG. 7, several repeats of the traditional extraction method and the same number with the method according to the invention, using the cartridge of FIG. 1, were performed. The measurements were taken in the same region of foam for the two preparations and at the same instant, by using a Leica-Leitz DMRXE optical microscope and Micro-Image System data processing and management software. The mean behaviors and standard deviations indicated in the figure were obtained.

It has been found that while in espresso coffee obtained with the traditional method many of the bubbles have diameters ranging from 20 to approximately 50-60 microns (line with triangles), in espresso coffee obtained with the method according to the invention over 40% of the bubbles have a diameter of more than 60 microns (line with diamonds).

Observing the development of the size of the bubbles over time, it has been noted that the beverage obtained with the method according to the invention always has bubbles with larger diameters.

Moreover, it has been found that the standard deviation for diameters from 80 to 150 microns is very low, and for these diameters the frequency ranges from 5 to 10%, approximately 10 times higher than that observed in espresso coffee obtained with the traditional method.

In practice it has been found that the beverage and the method according to the invention fully achieve the intended aim and objects, since they allow to achieve a considerable persistence of the crema independently of the factors that notoriously compromise its characteristics.

The invention thus conceived is susceptible of numerous modifications and variations, all of which are within the scope of the appended claims; all the details may further be replaced with other technically equivalent elements.

The disclosures in Italian Patent Application No. MI2006A000945 from which this application claims priority are incorporated herein by reference.

What is claimed is:

1. A method for extracting an espresso coffee beverage by means of an espresso coffee machine, comprising:
   a) a step for providing an extraction chamber, which comprises a dose of roasted and ground coffee and a normally-closed septum which is arranged downstream of said coffee dose and which is made of elastic material and which is provided directly with a small orifice extending through a septum body from a first side facing the coffee dose to a second side opposite the first side;
   b) a preinfusion step, in which a preset dose of hot water is injected into said chamber at a pressure ranging from 2 to 4 bars and for a first preset time interval, keeping the septum closed;
   c) a step of imbibition wherein the injection of hot water is interrupted for a second preset time interval to allow for homogenization of said coffee dose with the water injected in said preinfusion step, said septum being closed during said step of imbibition;
   d) a step for injecting hot water into said chamber after said step of imbibition, outward dispensing of the beverage being prevented through the normally-closed septum; and
   e) an extraction step in which, when the water pressure reaches a preset value ranging from 6 to 9 bars, the septum is deformed to assume a concave profile relative to the water and is thereby opened in order to force the beverage to pass through said small orifice before it is dispensed into a cup, the size of said orifice being such as to keep the dose of coffee contained in the extraction chamber at a substantially uniform pressure along the direction of the flow of hot water, so that the espresso coffee beverage extracted through said orifice comprises crema.

2. The method according to claim 1, comprising providing said extraction chamber as a rigid cartridge which contains said dose of coffee and the septum.

3. The method according to claim 1, wherein, in said extraction step e), the pressure upstream of the dose of coffee ranges from 9 to 12 bars, the pressure downstream of said dose and upstream of said septum ranges from 6 to 7 bars, and the pressure downstream of said septum is atmospheric pressure.

4. The method according to claim 1, wherein during said preinfusion step b) and during said injection step d) the injected hot water has a temperature between 90-99° C.

5. The method according to claim 4 wherein the injected hot water has a temperature of 96° C.

6. The method according to claim 1, wherein said first preset time interval of said preinfusion step is 1.1 seconds, and wherein said second preset time interval of said imbibition step is 2.5 seconds.

7. A method for extracting a beverage, comprising:
   providing an extraction chamber with a dose of roasted, ground coffee and an elastic septum arranged downstream of the dose of coffee which is pre-perforated in a central point to have an orifice extending through a septum body from a first side facing the coffee dose to a second side opposite the first side;
   while keeping the septum closed, injecting hot water into the chamber at a pressure ranging from 2 to 4 bars for a first time interval;
   while keeping the septum closed, interrupting the injection for a second time interval to allow for homogenization of the dose of coffee with the injected hot water;
   following the second time interval and while keeping the septum closed, injecting hot water into the chamber; and
   upon water pressure in the chamber reaching a value ranging from 6 to 9 or more bars, opening the septum by deformation of the septum to assume a concave profile relative to the water and to thereby to force the beverage to pass through the orifice prior to dispensation,
   a size of the orifice being such as to keep the dose of coffee contained in the chamber at a substantially uniform pressure along a direction of flow of the hot water and such that the beverage extracted through the orifice comprises crema.

8. The method according to claim 7, wherein a pressure in the chamber upstream of the dose of coffee ranges from 9 to 12 bars, a pressure downstream of the dose of coffee and upstream of the septum ranges from 6 to 7 bars and a pressure downstream of the septum is atmospheric pressure.

* * * * *